United States Patent [19]
Bliss

[11] 3,925,604
[45] Dec. 9, 1975

[54] ANALOG-RECORDING APPARATUS FOR RECORDING AND DERANDOMIZING RANDOMLY-OCCURRING DATA

[75] Inventor: Richard D. Bliss, Riverside, Calif.

[73] Assignee: Riverside Bio-Engineering, Inc., Riverside, Calif.

[22] Filed: Aug. 4, 1972

[21] Appl. No.: 277,966

[52] U.S. Cl............... 178/6.6 R; 178/7.4; 250/369; 360/6
[51] Int. Cl.² ....................... G01T 1/20; H04N 1/04
[58] Field of Search .......... 178/6.6 R, 6.6 P, 6.6 FS, 178/7.4; 250/363, 366, 369; 179/15 A; 340/174 AN, 173 R; 360/6

[56] References Cited
UNITED STATES PATENTS

| | | | |
|---|---|---|---|
| 3,142,824 | 7/1964 | Hill .................................. | 340/173 R |
| 3,509,341 | 4/1970 | Hindel et al. ...................... | 250/366 |
| 3,638,007 | 1/1972 | Brooks ............................. | 340/173 R |
| 3,655,974 | 4/1972 | Lucchesi ........................... | 250/366 |
| 3,777,146 | 12/1973 | Brunnet et al. ..................... | 250/369 |

*Primary Examiner*—James W. Moffitt
*Attorney, Agent, or Firm*—Nilsson, Robbins, Bissell Dalgarn and Berliner

[57] ABSTRACT

Radioactive particles such as gamma rays emanate from an organ of interest into which a radioactive substance has been injected and may be detected by a scintillation camera. The scintillation camera output is detected and analyzed to provide input information for use by a cathode ray tube to reproduce thereon the positions of the radioactive material in the organ of interest so that the same may be viewed by a physician or other interested person. The signals as applied to the cathode ray tube are stored by an analog-storage means as they occur. The stored signals are then sequentially removed, converted to a variable width pulse and differentiated, after which they are recorded upon a serial-recording medium such as a magnetic tape. The recorded information on the tape may be removed therefrom by converting the differentiated signal to a variable width pulse, which pulse is then converted to an amplitude representative of the variable width for re-application to the cathode ray tube for review by an interested party. The recorded tape may be played at speeds different from that at which it was recorded and it may be played forward or reverse without loss or degradation of the stored data.

13 Claims, 3 Drawing Figures

ANALOG-RECORDING APPARATUS FOR RECORDING AND DERANDOMIZING RANDOMLY-OCCURRING DATA

BACKGROUND OF THE INVENTION

1. Field of the Invention

The invention relates generally to recording and playback of analog signals and more specifically to a sequential non-random recording of analog signals representative of randomly-occurring data which signals are temporarily stored in an analog memory intermediate their occurrence and recordation.

2. Description of the Prior Art

Output signals from scintillation cameras generated by radioactive particles such as gamma rays are commonly applied to cathode ray tubes during a nuclear medicine procedure for detection of damaged or foreign tissues. The pattern produced on the screen of the cathode ray tube may also be photographed to produce a record thereof for future review by one interested therein.

The information appearing on the screen of the cathode ray tube is necessarily transitory in nature and may be viewed only once, that is, during the actual occurrence of the procedure. The pictures taken by a recording camera provide output information which is integrated over a relatively long period of time as compared to the time during which the information is actually being generated, that is, minutes of integration compared to microseconds of occurrence. Such integration precludes quantification of the particles creating the image appearing upon the picture generated by the recording camera. That is, any given area on the picture indicating the presence of a gamma ray may have been created by several gamma rays striking the same or a very similar position on the face of the cathode ray tube, thereby saturating that position on film. Dynamic recording of the signals applied to the cathode ray tube has been accomplished by digitizing the desired information then recording the same on a video tape utilizing the transverse rotating head recording medium. Through the digitizing techniques employed, the exact positioning of the radioactive material in the organ of interest is destroyed. Several particles of material may cause a multiplicity of gamma rays to emanate from a specific area of the organ of interest. The digitizing technique will cause all of these gamma rays to appear as a single dot on the cathode ray tube during the playback of the digitized information from the video tape. As a result of the rotating head transverse record techniques, data loss occurs in the deadtime when record or playback heads are not in direct contact with the tape. Furthermore, as a result of this type of recording technique, the magnetic tape is damaged by heads rotating thereacross. Such damage causes relatively short lifetime for the tape and results in data loss. As a result, one may obtain only a very small number of playbacks of information stored on the magnetic tape when utilizing the prior art digitizing techniques. In addition to the foregoing, the information stored on the tape through utilization of the prior art digitizing techniques may be recovered only by replaying the tape in the same direction and at the same speed at which it was recorded.

SUMMARY OF THE INVENTION

Analog signals representative of randomly-occurring data emanating from an area of interest are stored in a plurality of storage cells as they occur. Gating means applies each of the analog signals to one of the plurality of storage cells in the absence of a signal being stored thereon. The stored analog signal is sequentially removed from the plurality of storage cells and is recorded upon the serial-recording medium.

The recording signals are reproduced and reformed into signals which are identical with the original signals and may be utilized for any purpose desired by one having an interest in the data. For example, the signals may be applied to a cathode ray tube for providing a visual image or may be digitized for utilization with a computer or the like.

It is an object of the present invention to provide a recording apparatus which records transient phenomena of random nature in analog fashion and in derandomized sequence, to provide a recorded medium which may be played back at speeds different from that at which it was recorded, may be played back in either direction, and may be played back indefinitely without loss of data recorded upon the recording medium.

DETAILED DESCRIPTION OF THE INVENTION

Figure 1:
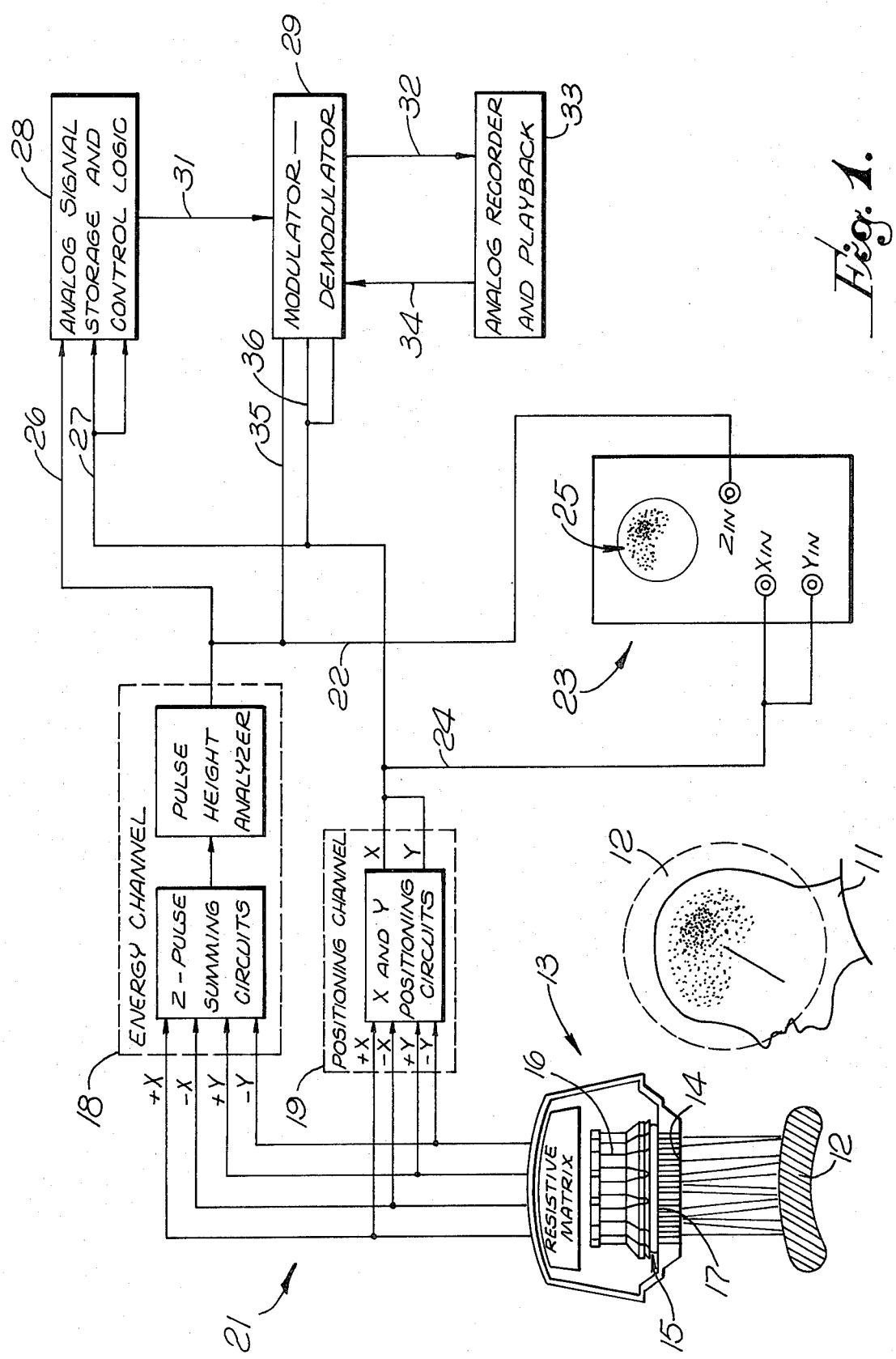
FIG. 1 is a schematic diagram in block form generally illustrating recording apparatus in accordance with the present invention interconnected with a scintillation camera to provide a system utilizable in nuclear medicine.

Referring now to FIG. 1, a subject 11 is shown having a radio isotope injected into an organ of interest 12 such as the brain. The radio isotope produces radioactive rays or particles such as gamma rays detectable by a scintillation camera 13. As is well known, the scintillation camera includes a multihole collimator 14, a light pipe 15 and photomultiplier tubes 16 as well as a gamma ray-sensitive crystal such as sodium iodide 17. When the crystal 17 is energized by the gamma rays, light is emitted which is then multiplied by the photomultiplier tube 16 and the gamma ray impingement position is determined by the resistive matrix in a particular position indicative of the position of the radio isotope in the organ of interest. The signals thus detected in the resistive matrix are applied to an energy-discriminating channel 18 and two positioning channels 19 over the plurality of leads 21. The energy-discriminating channel is utilized to determine that a particular output signal on the resistive matrix was in fact the result of impingement by an active gamma ray coming directly from the organ of interest and not due to a spurious event such as a cosmic ray. If such in fact is the case, then the energy-discriminating channel produces an unblanking signal which is applied by way of the lead 22 to the cathode ray tube shown generally at 23. Upon being thus unblanked, the cathode ray tube 23 receives positioning information over the leads 24 to cause the appearance on the scope 25 of a dot which is representative of the location of the radio isotope in the organ of interest and at the particular point where it was located when the gamma ray was generated. As is well known in the prior art, the signals generated for and applied to the cathode ray tube 23 to create the visual picture as shown at 25 are analog signals, generally voltage level signals, representative of the randomly-occurring gamma rays emanating from the organs of interest.

The thus randomly-occuring signals are applied over the leads 26 and 27 to an analog signal storage and control logic 28. The leads 26 and 27 are connected to the energy-discriminating and positioning channels 18 and 19 respectively and thus receive the same analog signal which is applied to the cathode ray tube 23. As will be more fully described hereinbelow, the analog signals responsive to certain timing signals are stored in an analog-storage medium as they occur. Thereafter the signals are removed from the storage medium and sequentially applied to a serial-recording medium. To properly accomplish recording, the signals are first modulated by a modulator-demodulator 29 which is connected by way of the lead 31 to the storage medium 28. After the signals are properly modulated, they are applied by way of the lead 32 to the analog recorder 33 for proper recording on a serial-recording medium such as a magnetic tape.

When desired, the analog recorder 33 may also be utilized as a playback apparatus. Under these circumstances, the signal which is reproduced from the magnetic tape is applied by way of the lead 34 to the demodulator portion of the modulator-demodulator 29. The output signal from the demodulator is then applied by way of the leads 35 and 36 to the cathode ray tube 23 through the leads 22 and 24 respectively.

From the foregoing, it can therefore be seen that the analog signals generated by the scintillation camera when focussed upon the organ of interest are not only applied to the cathode ray tube for immediate visual observation by the physician or other person of concern but at the same time, the same signal may be recorded on an analog-recording medium. The thus recorded signal is then played back for further review by utilizing the same cathode ray tube when the scintillation camera is not in use. It will be recognized by those skilled in the art that the recording apparatus may be controlled by the same control mechanism as is used for controlling the scintillation camera. Thus the physician or technician need be concerned only with the operation of the camera, thereby permitting the use of the recording apparatus without additional difficulties or hindrances on the part of the operator. If desired, however, it will also be understood that the recording apparatus may be manually controlled separate and apart from the camera thereby starting and stopping the recording medium only when there appears on the scope 25 of the cathode ray tube 23 information which it is desired to record.

Figure 2:
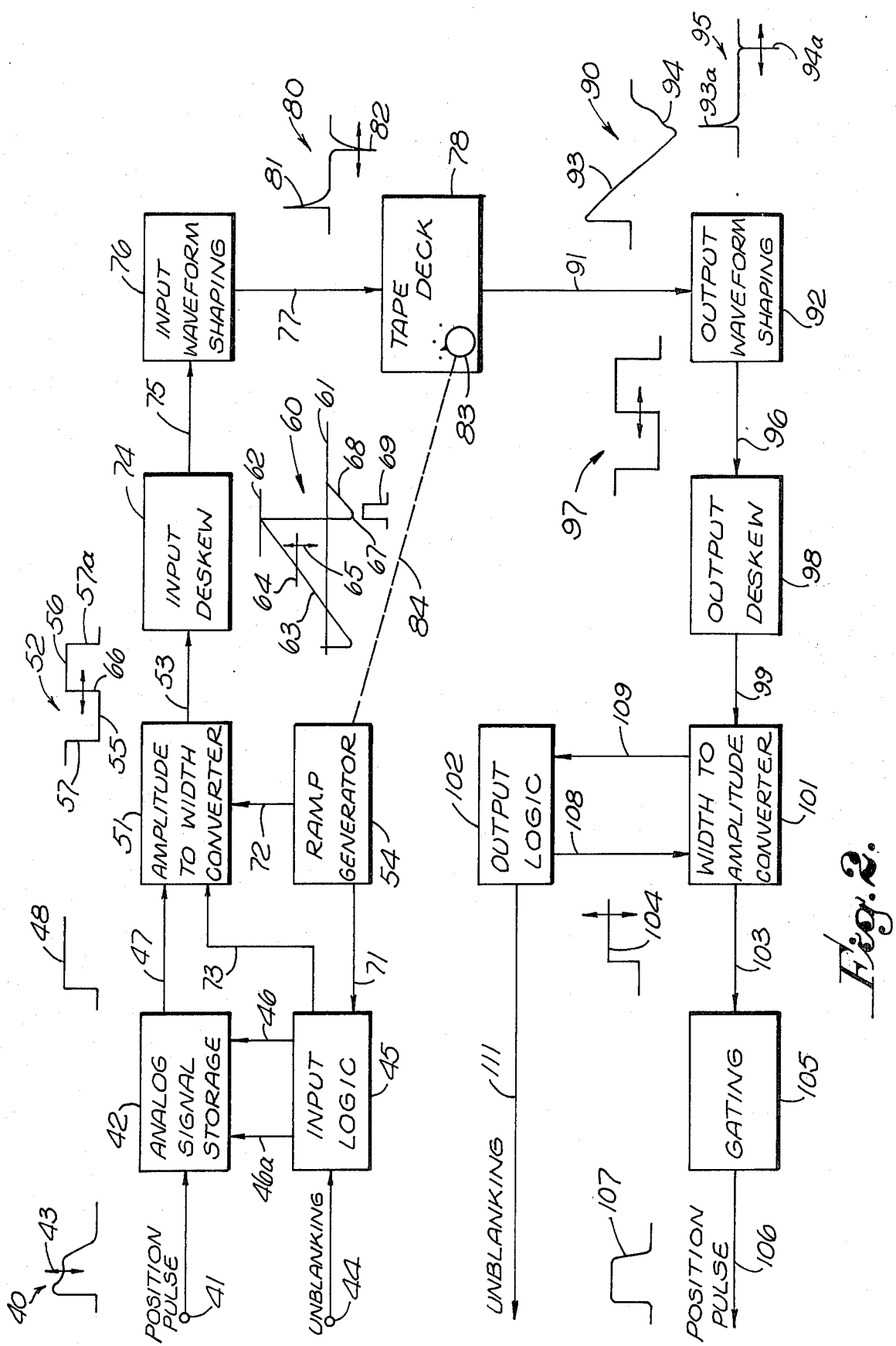
FIG. 2 is a schematic diagram in block form of a modulator-demodulator used in accordance with the present invention; and, FIG. 3 is a schematic diagram in block form of an analog signal storage medium in accordance with the present invention.

Referring now more particularly to FIG. 2, there is shown in block diagram a schematic of the modulator-demodulator 29. As is therein shown, a position pulse 40 such as would be generated by the positioning channels 19 is applied to the position pulse terminal 41 which is connected to the analog signal storage 42. It will be recognized by those skilled in the art that a particular channel for X position and a particular channel for Y position pulse information will be utilized in any given application. However, for purposes of simplicity and clarity of illustration and description, only a single channel will be illustrated and described. As is shown by the arrow 43, the position pulse 40 is an amplitude-varying analog signal. When applied to the analog signal storage 42, the amplitude level thereof may be stored. Upon application of the unblanking pulse produced by the energy-discriminating channel 18, the same is applied to the input terminal 44 of the input logic 45. The input logic 45 then applies a control signal over the lead 46 to the analog signal storage apparatus 42 whereby the stored amplitude level of the position signal is stored. The ramp generator generates a timing signal, which is applied to the input logic over lead 71. In response to this timing signal, the input logic applies a control signal over lead 46a to the analog signal storage apparatus 42 whereby the stored amplitude level of a particular storage cell (as will be more fully described hereinbelow) appears on lead 47. Thus, the amplitude level 48 of the stored signal will be applied to the amplitude-to-width converter 51.

The voltage level signal 48 is converted to a variable width pulse as is illustrated generally at 52, which pulse would appear on the output lead 53. To accomplish the conversion from amplitude to a variable width pulse, a ramp generator 54 functions to produce a linear ramp which is used to detect the amplitude level of the signal 48 appearing at the lead 47 to cause the low level 55 of the signal 52 to be changed to the high level as shown at 56. The beginning of the pulse 52 as shown at 57 always occurs at a predetermined time which is controlled by the repetition rate or frequency of the generated ramp. Thus, as can be seen by reference to the ramp signal shown generally at 60, there is provided first and second fixed references 61 and 62 respectively. As the ramp 63 crosses the fixed reference 61, the signal 52 changes from its high state 56 to its low state 55 to provide the beginning of the pulse as shown at 57. The varying voltage level or amplitude which appears on the lead 47 is shown by the reference line 64 and is indicated to be variable by the arrow 65. When the ramp crosses the voltage amplitude level 64, the signal 55 is caused to change to its high state 56 as is shown at 66. When the ramp reaches the voltage reference 62, it is caused to return to its beginning position 67 which is below the reference 61. At this point, the ramp generator again commences to produce the linear ramp as shown at 68. During the flyback or when the ramp returns from the level 62 to the level 67, a clock pulse 69 is generated. The clock pulse 69 is applied over the lead 71 from the ramp generator to the input logic 45 thus indicating the commencement of the new ramp. As the ramp 63 is generated, it is applied from the ramp generator 54 over the lead 72 to the amplitude-to-width converter 51 to accomplish the provision of the variable width pulse 52. As can be seen, the negative going portions of the signal appearing on the lead 53 (57-57A) always occur with the same frequency as controlled by the coincidence of the ramp 63 and the reference voltage 61. It is only the portion 66 of the pulse which varies, thereby providing the variable width pulse 52. The input logic 45 produces an inhibit signal which is applied over the lead 73 to the amplitude-to-width converter 51 to prevent generation of the signal in the event it is detected by the input logic 45 that there is no signal information stored in a particular cell sequentially ready for readout in the analog signal storage 42.

An input deskew circuit 74 is utilized to compensate for the interchannel time displacement error which results between the record heads or other portions of the two channels of electronics which may cause an inappropriate alignment of the simultaneously-occurring X and Y position information. Thus, the input deskew circuit 74 will cause the two signals to appear on the tape or other serial-recording medium in properly aligned position irrespective of the defects that may occur in the equipment.

The output of the input deskew circuit 74 is applied by way of the lead 75 to an input wave-form-shaping circuit 76. It has been found that an attempt to record on a serial magnetic recording medium such as magnetic tape a square wave that a reproduction thereof does not provide exact information or reproduction of a square wave. It has been found that the reproduced signal has sloping wave forms and also that the zero crossing level varies from time to time as the tape is replayed depending upon the recorded pulse duty cycle. Thus, even though one attempts to reproduce a square wave by detecting the zero crossing points of the reproduced signal, such will vary depending upon the level shift imparted to the signal for the reasons above referred to. To preclude the occurrence of the indefiniteness which would be imparted to the time-varying square wave signal which is representative of the voltage level received from the position information, the input wave-form-shaping circuit 76 produces a differentiated signal as is shown at 80 and which appears on the lead 77 for application to the recording medium such as the tape deck 78. The differentiated signal 80 provides a positive going pulse 81 which is representative of the leading edge 57 of the pulse 52 and a negative going pulse 82 which is representative of the trailing edge 66 of the time-varying square wave pulse 52. There is thus provided an accurate zero level crossing detection capability which provides an accurate playback signal that may be utilized to produce with a high degree of accuracy the amplitude level signal representative of the desired position.

It will also be recognized by those skilled in the art that the tape deck 78 may be played at various speeds during recording and also during playback. A speed selector 83 is provided showing typically three positions on the front of the tape deck. As is indicated by the dashed line 84, there is an interconnection between the speed selector 83 and the ramp generator to control the frequency of occurrence of the ramp to be commensurate with the particular speed as selected.

In the playback mode, the signal 80 as recorded on the tape will appear in a much less refined fashion such as that shown at 90 and will appear on the lead 91. To provide the desired regeneration of the variable time width square pulse, the signal 90 is applied to the output wave-form-shaping circuit 92 wherein the signal is first again differentiated to provide the signal as shown at 95. The thus differentiated signal is applied to a square wave-producing circuit and operates as a trigger signal thereto. Thus, upon the occurrence of the positive going signal 93-93A, the circuit is caused to go from one of its states to the other where it remains until the occurrence of the other portion of the signal as shown at 94-94A, at which point in time the state reverses. Thereby, at the lead 96, there appears a variable width square wave pulse 97 which is a reproduction of the original pulse 52 recorded upon the tape by the tape deck 78. An output deskew circuit 98 is connected by way of the lead 96 to receive the signal 97 and operates for the same reason in much the same fashion as does the input deskew circuit 74. The varying time square wave pulse 97 is applied by way of the lead 99 to the width-to-amplitude converter 101. The width-to-amplitude converter 101 utilizes a ramp circuit much in the same manner as above described in conjunction with an output logic circuit 102. In this particular instance, as the leading edge of the variable width pulse occurs, a ramp generator is commenced to operate to produce a linear ramp which is utilized to charge a capacitor. When the linear ramp coincides with the trailing, variable time, edge of the square wave, the generation of the ramp ceases and the charge on the capacitor is retained at that particular level. As a result, appearing on the lead 103 is a variable amplitude signal 104 which is applied to a gating network 105, the output of which is applied by way of the lead 106 to the desired use such as the scope of the cathode ray tube apparatus above referred to. The gate causes an appearance on the lead 106 of a position pulse such as shown at 107. The output logic 102 is interconnected with the converter 101 by way of the leads 108 and 109. The output logic senses when the ramp voltage coincides with the variable width trailing edge of the pulse 97. The output logic 102 also determines whether the level of voltage appearing is of sufficient magnitude to in fact be a signal that has been recorded responsive to occurrence of the original data. In the event that the voltage level is insufficient to represent such a signal, then an inhibit pulse is applied to preclude a readout of that particular information. At the same time, the output logic 102 generates an unblanking pulse which is applied by way of the lead 111 to the scope of the cathode ray tube as above referred to.

Figure 3:
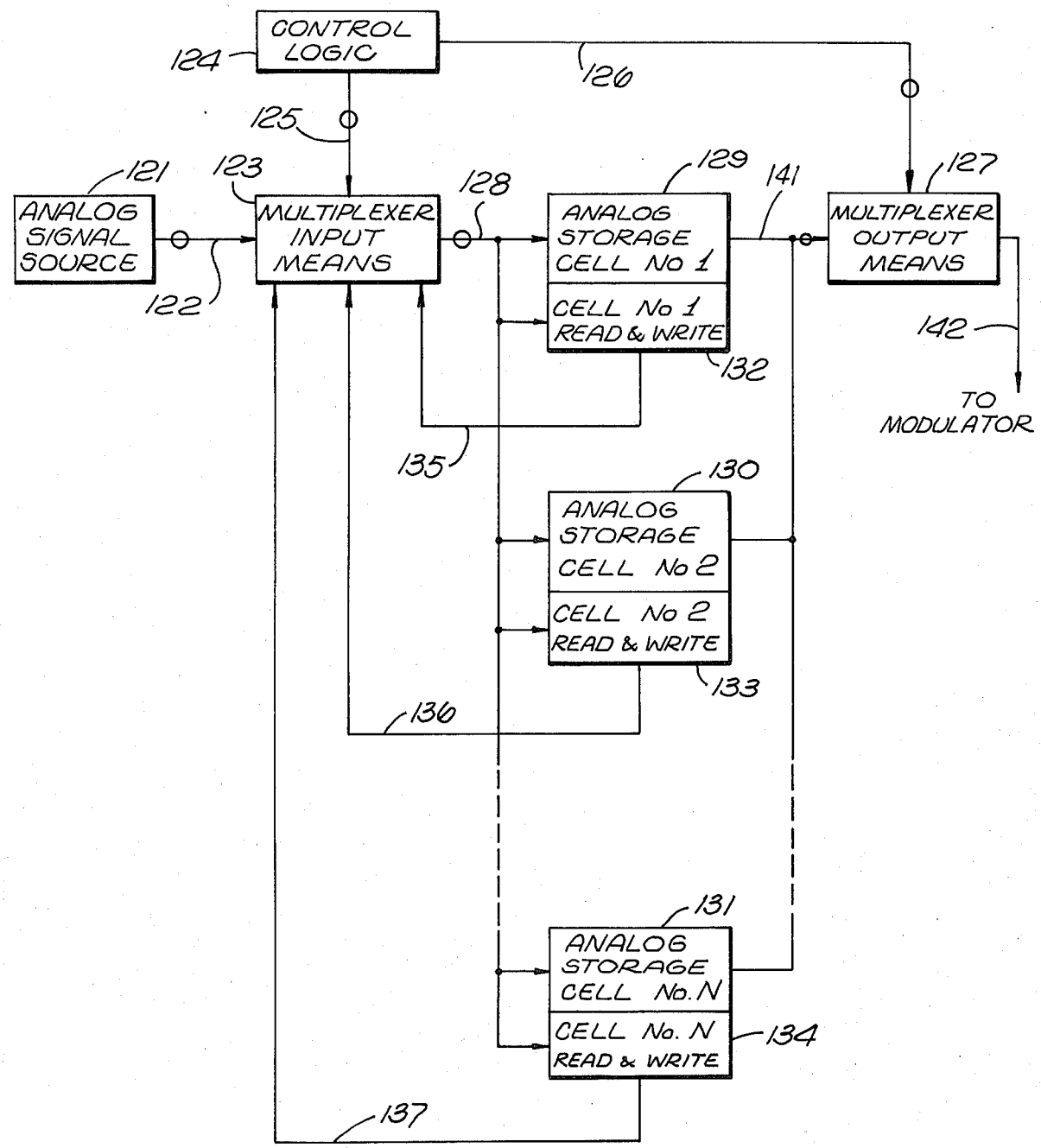

Referring now more specifically to FIG. 3, there is illustrated in block diagram and in further detail, the analog storage apparatus utilized in conjunction with the present invention. As is therein shown, an analog signal source 121 is connected by a cable 122 to an input multiplexer means 123. The signals as generated by the scintillation camera and the two channels to provide the unblanking as well as the position pulse information may be viewed as a typical source of such input signals. Control logic 124 is connected by a cable 125 to the input multiplexer means 123 and also by the cable 126 to an output multiplexer means 127. A series of cables 128 is connected from the output of the input multiplexer means 123 to a plurality of analog storage cells 129, 130, and 131.

As will be seen from the designation of the storage cells as storage cell No. 1, storage cell No. 2, and storage cell No. N, any number of storage cells may be utilized in the application under consideration. In accordance with the specific embodiment of the current preferred apparatus wherein a recording medium includes a deadtime of approximately 120 microseconds and a storage medium includes a deadtime of approximately 6 microseconds, it has been found that by utilizing 16 such analog storage cells for each channel of information there is less than a 1 percent loss of data in even extreme cases when utilizing the current scintillation cameras and dosages of radio isotopes which are injected into the patients for a particular procedure.

Each of the storage cells includes a read and write switch integrally associated therewith as is illustrated at 132, 133, and 134. The cable 128 also includes interconnections between the multiplexer input means and each of the read and write switches associated with each of the analog storage cells. In addition thereto, leads 135, 136 and 137 are interconnected from the read and write switches 132, 133 and 134 respectively and the input multiplexer means 123.

In operation, the randomly-occurring data appearing on the leads 122 are applied to, and they occur through, the input multiplexer means 123 to a preselected one of the several analog storage cells. The storage cell is selected based upon whether the same is currently filled with previously-stored data that has not been removed by the readout means for recording as above referred to in conjunction with the description of FIG. 2, that is, the randomly-occurring information will be typically stored in a sequential fashion under the direction of the control logic to the plurality of storage cells. In the event, however, that all of the storage cells are filled, and none is available to receive the occurring information, then the same is lost. However, in the event that a storage cell is capable of receiving the information, then the cell write switch so indicates and the amplitude-varying signal is applied to the storage cell where it is then held until the modulator circuit is ready to receive the same for appropriate shaping and recordation on the recording medium. When such is ready to occur, the storage cell read switch is activated and under the control logic, the output multiplexer means receives that storage cells amplitude level signal over the cable 141 and applies it by way of the lead 142 to the modulator circuit.

The analog storage cells 1 through N may be any type of device capable of receiving an analog signal and retaining the same for the required period of time to enable readout thereof for appropriate recording on a sequential basis as above described. In a preferred embodiment of such a storage cell in accordance with the present invention, the cell constitutes a capacitor with the input thereof connected through appropriate switching to the source and with the output thereof connected through a source follower circuit to the modulator.

It will now be recognized by those skilled in the art that through the analog-recording technique above described wherein randomly-occurring data is recorded in a sequential non-random manner on a serial-recording medium such as a magnetic tape. There is provided a means whereby the thus recorded information may be reproduced at any playback speed desired by the user. Thus, if the playback speed is faster than that at which the information was originally recorded there is a compression thereof which causes the information to be presented more rapidly on the scope of the CRT than would otherwise be the case. Also the information may be stretched by playing the same back at a speed slower than that at which it was recorded. On the other hand, the user may play a particular portion of the recorded information which is most pertinent to the procedure being formed and which provides the most dynamic information about the area of interest in such a way that it will be played forward then reverse, then forward as many times as the user desires in order to obtain all of the information available about the critical area of interest. Such a capability can become particularly important in many instances where blockages occur such as in a coronary study and where such blockages can only be determined by viewing dynamically the information available from a nuclear procedure as the radio isotope enters the particular area under study. Under these circumstances, a gross loss of data or an integrated picture such as required by a recording camera will cause a complete dropout of such dynamic transitory data. It can thus be seen that there is provided a more versatile diagnostic tool for utilization particularly in nuclear medicine procedures that has heretofore been available in the prior art.

What is claimed is:

1. Analog-recording apparatus for recording analog signals on serial-recording medium in a derandomized fashion which signals are representative of randomly-occurring data emanating from a detector, said apparatus comprising:

A. a plurality of storage cells each adapted to receive and store for later complete removal one of a plurality of analog signals representative of randomly-occurring data;
    B. timing means for generating first and second time intervals;
    C. gating means operative during said first time interval for applying one of said analog signals upon generation thereof to one of said cells only in the absence of a signal being stored therein; and
    D. means operative during said second time interval for sequentially removing said stored signals from said cells with a regularized time interval therebetween for recording on said recording medium.

2. Analog recording apparatus according to claim 1 wherein said gating means sequentially applies said signals to said cells whereby the first of said cells to receive a signal for storing thereon is the first cell to have said stored signal removed therefrom.

3. Recording apparatus in accordance with claim 1 wherein said sequential removing means includes a signal amplitude-to-pulse duration converter for receiving said analog signal and providing a variable duration pulse which is representative of the amplitude of said analog signal.

4. Recording apparatus in accordance with claim 3 wherein said converter means includes a ramp generator coupled to receive said analog signal and to provide the variable time position of the trailing edge of said pulse responsive to coincidence of the amplitude of said signal and said ramp.

5. Recording apparatus in accordance with claim 3 wherein said sequential removing means further includes differentiation means coupled to said converter means for providing individual pulses at the leading and trailing edges of said variable width pulse for application to said recording medium for recordation thereon.

6. Apparatus in accordance with claim 5 which further includes a playback head for reproducing said recorded differentiated signal, wave-shaping means for converting said differentiated signal to a variable-duration pulse and pulsewidth-to-amplitude converter means for converting said variable-duration pulse to an amplitude representative of said variable duration.

7. Apparatus according to claim 1 which further includes a multiplexer means for receiving said analog signal and controlling the application thereof to said pluralitiy of storage cells.

8. Apparatus according to claim 7 which further includes second multiplexer means for controlling the application of said stored analog signal to said recording medium.

9. Apparatus according to claim 8 which further includes control logic connected to said multiplexer means.

10. Analog record-playback apparatus for non-random reproduction of variable amplitude analog signals representative of randomly-occurring data emanating from an area of interest comprising:
- A. analog signal storage means for receiving said signals as they occur and storing the same for a predetermined period of time;
- B. analog signal-recording means;
- C. analog signal-removal means coupled between said storage means and recording means for sequentially removing said stored signals from said storage means and applying said removed signals to said recording means for recording thereon, said signal-removal means including:
  1. first converter means for converting said variable amplitude signals to variable time-duration signals having predetermined leading and trailing edge slopes, and
  2. first wave-shaping means for differentiating said variable time-duration signal for application thereof to said recording means;
- D. control means for controlling reception and removal of said signals with respect to said storage means;
- E. means for reproducing said recorded signal from said recording means;
- F. second wave-shaping means for converting said reproduced signal to a variable time-duration signal; and
- G. second converter means for converting said variable time-duration signal to a variable amplitude signal.

11. Analog record-playback apparatus according to claim 10 wherein said first converter means includes a ramp generator for providing a linear ramp signal between first and second fixed reference potentials, said amplitude of said stored analog signal falling between said reference potentials, said leading edge of said variable time-duration signal occurring upon coincidence of said ramp and said first reference and said trailing edge thereof occurring upon coincidence between said ramp and said amplitude of said stored signal.

12. Analog record-playback apparatus according to claim 10 which further includes cathode ray tube means and means coupling said cathode ray tube means to said record converter means for providing a visual representation of said recorded signals.

13. Analog record-playback apparatus according to claim 12 which further includes scintillation camera means and means coupling said scintillation camera means to said cathode ray tube means and said analog signal storage means for simultaneously providing a visual representation in real time of randomly-occurring data from an area of interest viewed by said camera and as a derandomized record thereof on said recording means.

* * * * *